US011041288B2

(12) United States Patent
Hiromatsu et al.

(10) Patent No.: US 11,041,288 B2
(45) Date of Patent: Jun. 22, 2021

(54) WORK MACHINE

(71) Applicant: HITACHI CONSTRUCTION MACHINERY CO., LTD., Tokyo (JP)

(72) Inventors: Kohei Hiromatsu, Ushiku (JP); Manabu Edamura, Kasumigaura (JP); Shiho Izumi, Hitachinaka (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 140 days.

(21) Appl. No.: 16/329,387

(22) PCT Filed: Feb. 8, 2018

(86) PCT No.: PCT/JP2018/004321
§ 371 (c)(1),
(2) Date: Feb. 28, 2019

(87) PCT Pub. No.: WO2018/155202
PCT Pub. Date: Aug. 30, 2018

(65) Prior Publication Data
US 2019/0218749 A1 Jul. 18, 2019

(30) Foreign Application Priority Data

Feb. 21, 2017 (JP) .............................. JP2017-030508

(51) Int. Cl.
E02F 9/20 (2006.01)
E02F 9/26 (2006.01)
(Continued)

(52) U.S. Cl.
CPC ............... E02F 9/20 (2013.01); E02F 3/438 (2013.01); E02F 3/841 (2013.01); E02F 9/2045 (2013.01);
(Continued)

(58) Field of Classification Search
CPC .................................... E02F 5/145; E02F 9/26
See application file for complete search history.

(56) References Cited

U.S. PATENT DOCUMENTS 5,999,872 A  12/1999 Kinugawa et al.
2003/0001750 A1* 1/2003 Ishimoto ................... E02F 9/26
340/691.6
(Continued)

FOREIGN PATENT DOCUMENTS

JP   10-266273 A    10/1998
JP   10266273 A  * 10/1998 ............ E02F 9/2235
(Continued)

OTHER PUBLICATIONS

International Preliminary Report on Patentability received in corresponding International Application No. PCT/JP2018/004321 dated Sep. 6, 2019.
(Continued)

Primary Examiner — Thomas G Black
Assistant Examiner — Sara J Lewandroski
(74) Attorney, Agent, or Firm — Mattingly & Malur, PC

(57) ABSTRACT

A hydraulic excavator acquires operation content frequency data in a designated period based on output values output from a plurality of sensors sensing parameters that serve as indicators of operation contents performed via an operation device. A storage section stores a plurality of guide screens each corresponding to one of a plurality of work patterns of the hydraulic excavator. A work identifying section searches actual result data in the storage section for actual result data that matches or is similar to the operation content frequency data acquired by the data acquiring section in terms of operation contents and frequency thereof, and that identifies a current work pattern based on a work pattern allocated to actual result data related to a result of the search. A display device displays a guide screen corresponding to the work
(Continued)

pattern identified by the work identifying section among the plurality of guide screens.

4 Claims, 9 Drawing Sheets

(51) Int. Cl.
    *E02F 3/43* (2006.01)
    *E02F 3/84* (2006.01)
    *E02F 5/14* (2006.01)
(52) U.S. Cl.
    CPC .............. *E02F 9/26* (2013.01); *B60Y 2200/41* (2013.01); *E02F 5/145* (2013.01)

(56) References Cited

U.S. PATENT DOCUMENTS

| | | | | |
|---|---|---|---|---|
| 2003/0001751 A1* | 1/2003 | Ogura | ........................ | E02F 9/26 |
| | | | | 340/691.6 |
| 2013/0158787 A1* | 6/2013 | Nomura | .................. | E02F 9/264 |
| | | | | 701/34.4 |
| 2013/0158797 A1* | 6/2013 | Fukano | .................... | E02F 9/264 |
| | | | | 701/36 |
| 2014/0190046 A1* | 7/2014 | Shibata | .................. | E02F 9/2012 |
| | | | | 37/403 |
| 2016/0193920 A1* | 7/2016 | Tsubone | .................... | E02F 9/16 |
| | | | | 701/36 |
| 2019/0241124 A1* | 8/2019 | Izumikawa | ............. | B60R 11/04 |

FOREIGN PATENT DOCUMENTS

| | | | | |
|---|---|---|---|---|
| JP | 10266723 A | * | 10/1998 | ................ E02F 9/26 |
| JP | 2012-172424 A | | 9/2012 | |
| JP | 2012172424 A | * | 9/2012 | |
| KR | 10-2013-0044395 A | | 5/2013 | |

OTHER PUBLICATIONS

International Search Report of PCT/JP2018/004321 dated Apr. 10, 2018.

Extended European Search Report received in corresponding European Application No. 18758185.5 dated Feb. 19, 2021.

\* cited by examiner

FIG. 5

| TRAVEL | SWING | WORK LOAD | 2 m OR SHORTER TO TARGET SURFACE | AT OR LOWER THAN TARGET SURFACE | Bm RAISING | Bm LOWERING | Am PULLING | Am PUSHING | Bk PULLING | Bk PUSHING | OPERATIONAL DATA / OPERATION CONTENTS |
|---|---|---|---|---|---|---|---|---|---|---|---|
| ○ | — | — | × | × | — | — | — | — | — | — | TRAVEL OPERATION |
| × | ○ | — | — | × | × | × | × | × | × | × | SWING OPERATION |
| × | ○ | ○ | × | × | ○ | × | — | — | — | × | LOADING OPERATION |
| × | ○ | ○ | × | × | × | ○ | — | — | — | × | UNLOADING OPERATION |
| × | × | ○ | ○ | — | — | — | ○ | × | — | — | EXCAVATING OPERATION |
| × | — | ○ | ○ | ○ | — | × | × | — | × | ○ | EMBANKING OPERATION |
| × | — | ○ | × | × | — | × | × | — | × | ○ | SOIL-DROPPING OPERATION |
| × | × | ○ | ○ | — | × | ○ | × | × | — | — | SLOPE-TAMPING OPERATION |
| × | × | × | — | — | × | ○ | — | — | — | — | LOWERING OPERATION |
| × | × | × | — | — | ○ | × | — | — | — | — | RAISING OPERATION |
| × | × | — | — | — | × | × | × | × | × | × | STOP |

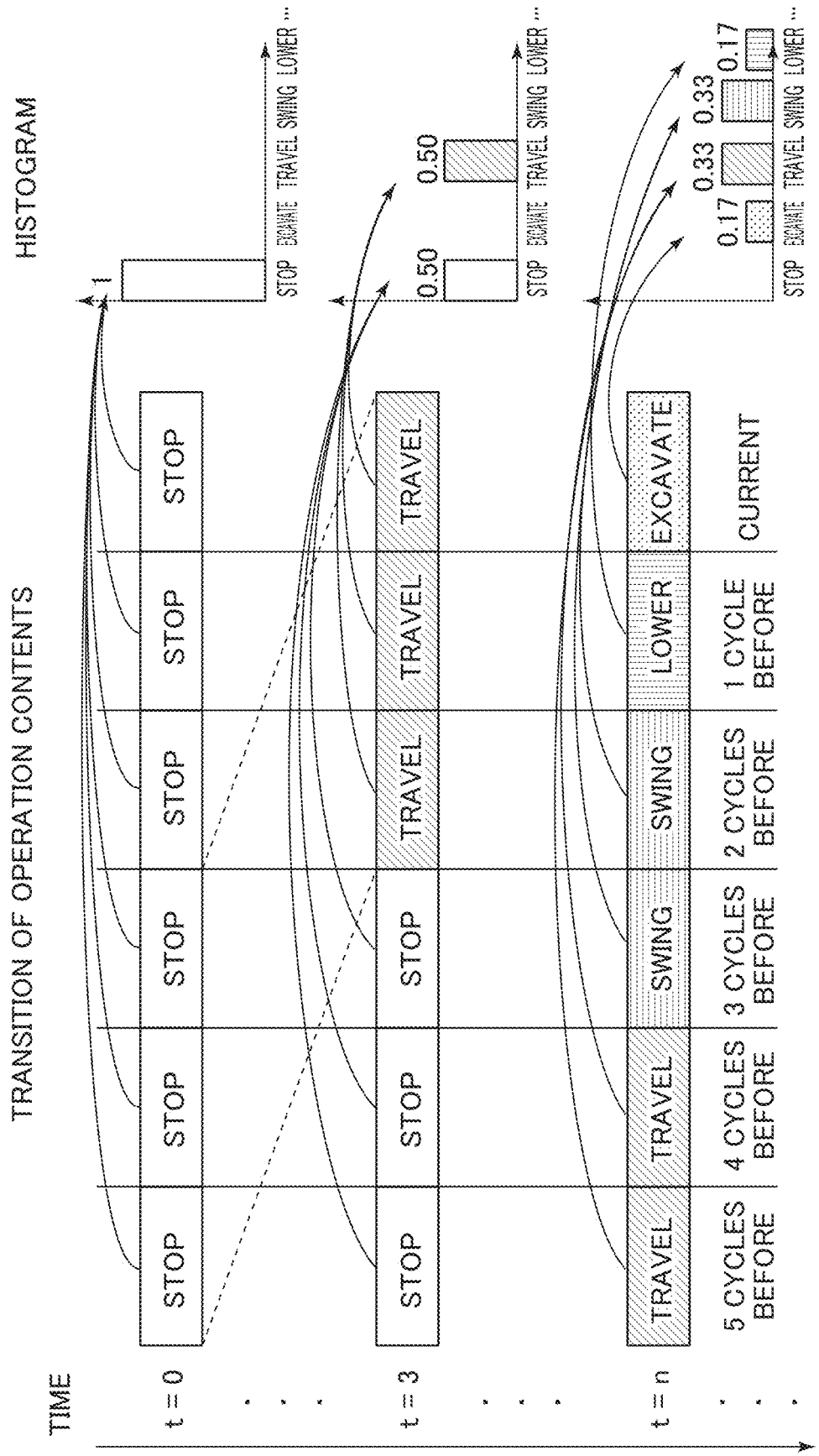

ACTUAL RESULT DATA COUNT WITHIN SEARCHED RANGE
 • LOADING PATTERN(S): 3
 • NORMAL EXCAVATION PATTERN(S): 1   ⇒   CLASSIFICATION RESULT:
 • TRAVEL PATTERN(S): 1                    LOADING PATTERN

ID
WORK MACHINE

TECHNICAL FIELD

The present invention relates to a work machine.

BACKGROUND ART

A work machine such as a hydraulic excavator has: a work implement including a plurality of link members such as a boom, an arm, and a bucket; a track device for effecting movement of the work machine; and the like. An operator operates an operation lever and causes actions of actuators that drive the respective link members, the track device and the like to thereby perform targeted works. At an actual construction site, such targeted works are determined as target work surfaces in design drawings or the like. Since it is difficult to grasp a target work surface only with visual assessment of situations by an operator, marks such as finishing stakes or leveling strings are conventionally placed at a construction site to let the operator know the target work surface.

However, placement of finishing stakes or leveling strings is cumbersome, and furthermore construction in strict accordance with the target work surface requires an operator to have skills. In view of this, in recent years, systems called machine guidance are prevalent, in which systems posture sensors are provided to work implements so as to calculate the positions of the work implements, and the distances between target work surfaces that are obtained from design drawing data and the work implements, or the like are displayed on screens as diagrams or numerical values, and it has become possible to let operators grasp the target work surfaces easily.

As a technique related to machine guidance, there is a position guidance system for hydraulic excavators (see Patent Document 1, for example). In the system, it is concluded whether or not a hydraulic excavator is in a traveling state, and when it is concluded that the state of the hydraulic excavator is changed from a traveling stop state to a traveling state, the guide screen displayed on a display section is automatically switched from a work mode guide screen indicating a positional relation between a target work subject and a work implement to a traveling mode guide screen indicating a current position of the hydraulic excavator in a work area.

PRIOR ART DOCUMENT

Patent Document
Patent Document 1: JP-2012-172424-A

SUMMARY OF THE INVENTION

Problem to be Solved by the Invention

According to the system in Patent Document 1, it is concluded that the state of the hydraulic excavator has changed from a traveling stop state to a traveling state when it is sensed that a travel operation member (operation lever) at its neutral position is operated in a forward moving direction or a backward moving direction. This means that if an operation of the travel operation member is sensed, the guide screen of the display section is automatically switched from the work mode guide screen to the traveling mode guide screen.

Meanwhile, for example, in a work in which an excavating operation and a travel operation are performed alternately in a short time and in which excavation is the main work and traveling is a supplementary work, for example, in a work in which moving and excavation are repeated as in a ditch excavation work or a surface soil-removing work, the importance of displaying a traveling mode guide screen is low in terms of work efficiency and rather a work mode guide screen is preferably displayed continuously. However, in the system in Patent Document 1, the traveling mode guide screen is displayed every time the travel operation member is operated, and this results in the work mode guide screen and the traveling mode guide screen being displayed alternately. In this manner, since in the system in Patent Document 1 the guide screen is automatically switched based only on whether or not it is concluded that the travel operation member is operated, guide screens in accordance with actual work contents might not be displayed.

The present invention has been made in view of the above-mentioned problems, and an object thereof is to provide a work machine that can display guide screens in accordance with work contents when construction of target work surfaces is executed by the work machine.

Means for Solving the Problem

The present application includes a plurality of means for solving the problems, and one example of them is a work machine including an operation device that outputs an operation signal corresponding to an operation amount, and a plurality of actuators that are driven based on the operation signal output from the operation device. The work machine includes a plurality of sensors that senses a plurality of parameters to serve as indicators of operation contents performed via the operation device, a display device that displays a guide screen corresponding to a work pattern of the work machine, and a controller that performs screen display control of the display device. The controller includes a data acquiring section that acquires operation content frequency data indicating operation contents performed on the work machine and frequency of the operation contents in a period starting a predetermined time before a current time and ending at the current time, based on an output value output from the plurality of sensors in the period, a storage section storing a plurality of guide screens each corresponding to one of a plurality of work patterns registered in advance as work patterns of the work machine, a work identifying section that identifies a work pattern at the current time from the plurality of work patterns based on the operation content frequency data acquired by the data acquiring section, and a display control section that selects, from the plurality of guide screens, a guide screen corresponding to the work pattern identified by the work identifying section. The display device displays the guide screen selected by the display control section.

Effect of the Invention

According to the present invention, the work efficiency improves because guide screens in accordance with work contents are displayed automatically.

BRIEF DESCRIPTION OF DRAWINGS

FIG. 5 is a diagram illustrating an exemplary correspondence between categorization results of operational data and operation contents.

FIG. 6 is a diagram illustrating a procedure of creating histograms indicating operation content frequency data.

MODES FOR CARRYING OUT THE INVENTION

Figure 1:
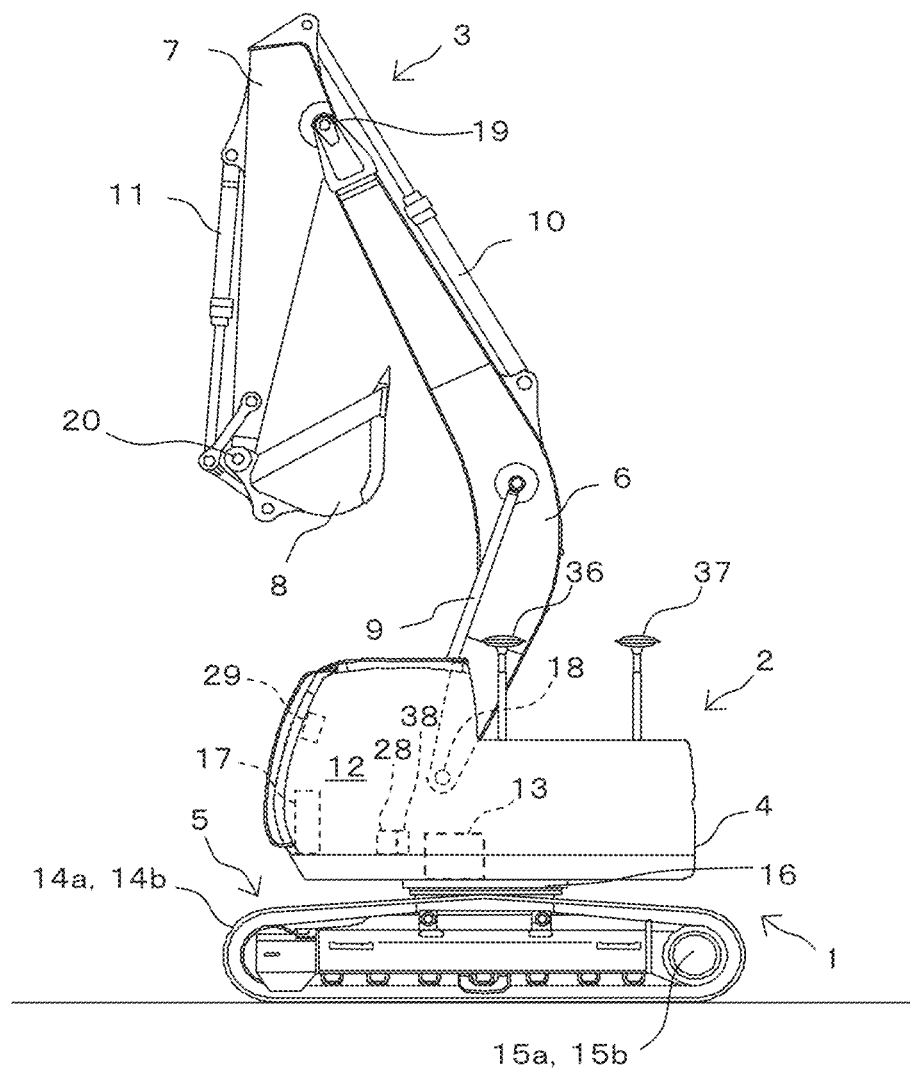
FIG. 1 is a side view of a hydraulic excavator according to an embodiment of the present invention.

Hereinafter, a work machine and a display system thereof according to an embodiment of the present invention are explained with reference to the drawings, using a hydraulic excavator as an example. Note that, in the following explanation, a hydraulic excavator including a bucket as an attachment to the tip of a work implement is illustrated as an example, but the present invention can be applied to a hydraulic excavator including an attachment other than a bucket. Furthermore, the present invention can be applied also to a work machine other than a hydraulic excavator if the work machine includes an operation device that outputs an operation signal corresponding to an operation amount and a plurality of actuators that are driven based on the operation signal output from the operation device.

In addition, in the following explanation, alphabets are given to the ends of reference characters (numbers) in some cases if there are a plurality of identical components, but the plurality of components are denoted collectively in some cases by omitting the alphabets. For example, if there are three pumps 300a, 300b, and 300c, these are denoted collectively as the pump 300 in some cases.

FIG. 1 is a side view of a hydraulic excavator 1 according to the embodiment of the present invention. The hydraulic excavator 1 includes: a machine main body 2 having an upper swing structure 4 and a lower track structure 5; and a work implement (front work implement) 3 attached to the upper swing structure 4.

The work implement 3 is an articulated-type work implement including: a boom 6 attached pivotably to the upper swing structure 4 via a boom pin 18; an arm 7 attached pivotably to the tip of the boom 6 via an arm pin 19; and a bucket 8 attached pivotably to the tip of the arm 7 via a bucket pin 20. Then, the work implement 3 includes a boom cylinder 9, an arm cylinder 10 and a bucket cylinder 11 which are hydraulic cylinders (hydraulic actuators) for driving the members of those boom 6, arm 7 and bucket 8.

The lower track structure 5 includes: a left travel motor 15a and a right travel motor 15b; and left and right crawlers (continuous tracks) 14a and 14b respectively driven by those travel motors 15a and 15b. The hydraulic excavator 1 travels by the travel motors 15a and 15b being driven and the crawlers 14a and 14b being rotated. The lower track structure 5 is not limited to a crawler-type like the illustrated one, but a wheel-type lower track structure having a plurality of wheels can certainly be utilized.

The upper swing structure 4 is attached swingably to an upper portion of the lower track structure 5 via a slewing ring 16, and is swing-driven by a swing drive device (swing motor) 13. On the upper swing structure 4, a cabin 12; a hydraulic pump (not illustrated) that delivers hydraulic operating fluid of a hydraulic actuator; a prime mover (not illustrated), for example, an engine or a motor, for driving the hydraulic pump; and a device such as a computer including a controller 28 that performs screen display control of a display device 29 are mounted.

In addition, two antennae 36 and 37 of RTK-GNSS (Real Time Kinematic-Global Navigation Satellite Systems (GNSS stands for Global Navigation Satellite System)) are attached to the upper swing structure 4.

In the cabin 12, an operation device 17 that outputs an operation signal corresponding to an operation amount, and the display device 29, for example, a liquid crystal display (LCD) or the like, on which a guide screen corresponding to a work pattern of the hydraulic excavator 1 is displayed are provided. By an operator operating the operation device 17, an operation signal is output, and it is possible to drive the boom cylinder 9, the arm cylinder 10, the bucket cylinder 11, the swing drive device 13, and the travel motors 15a and 15b separately based on the operation signal.

In the present embodiment, the operation device 17 mounted includes a plurality of levers including a first operation lever for instructing raising/lowering of the boom 6 and dumping/crowding of the bucket 8 separately, a second operation lever for instructing dumping/crowding of the arm 7 and left/right swinging of the upper swing structure 4 separately, a first travel lever for instructing forward rotation/reverse rotation of the travel motor 15a, and a second travel lever for instructing forward rotation/reverse rotation of the travel motor 15b (none of the levers illustrated). The first operation lever and second operation lever are multi-function operation levers each with dual function. A back/forth operation of the first operation lever corresponds to raising/lowering of the boom 6, and a left/right operation of the first operation lever corresponds to crowding/dumping of the bucket 8. A back/forth operation of the second operation lever corresponds to dumping/crowding of the arm 7, and a left/right operation of the second operation lever corresponds to left/right rotation of the upper swing structure 4. If a lever is operated in an oblique direction, two corresponding actuators make actions simultaneously. The first travel lever and second travel lever are mono-function operation levers. A back/forth operation of the first travel lever corresponds to forward rotation/reverse rotation of the travel motor 15a, and a back/forth operation of the second travel lever corresponds to forward rotation/reverse rotation of the travel motor 15b.

Figure 2:
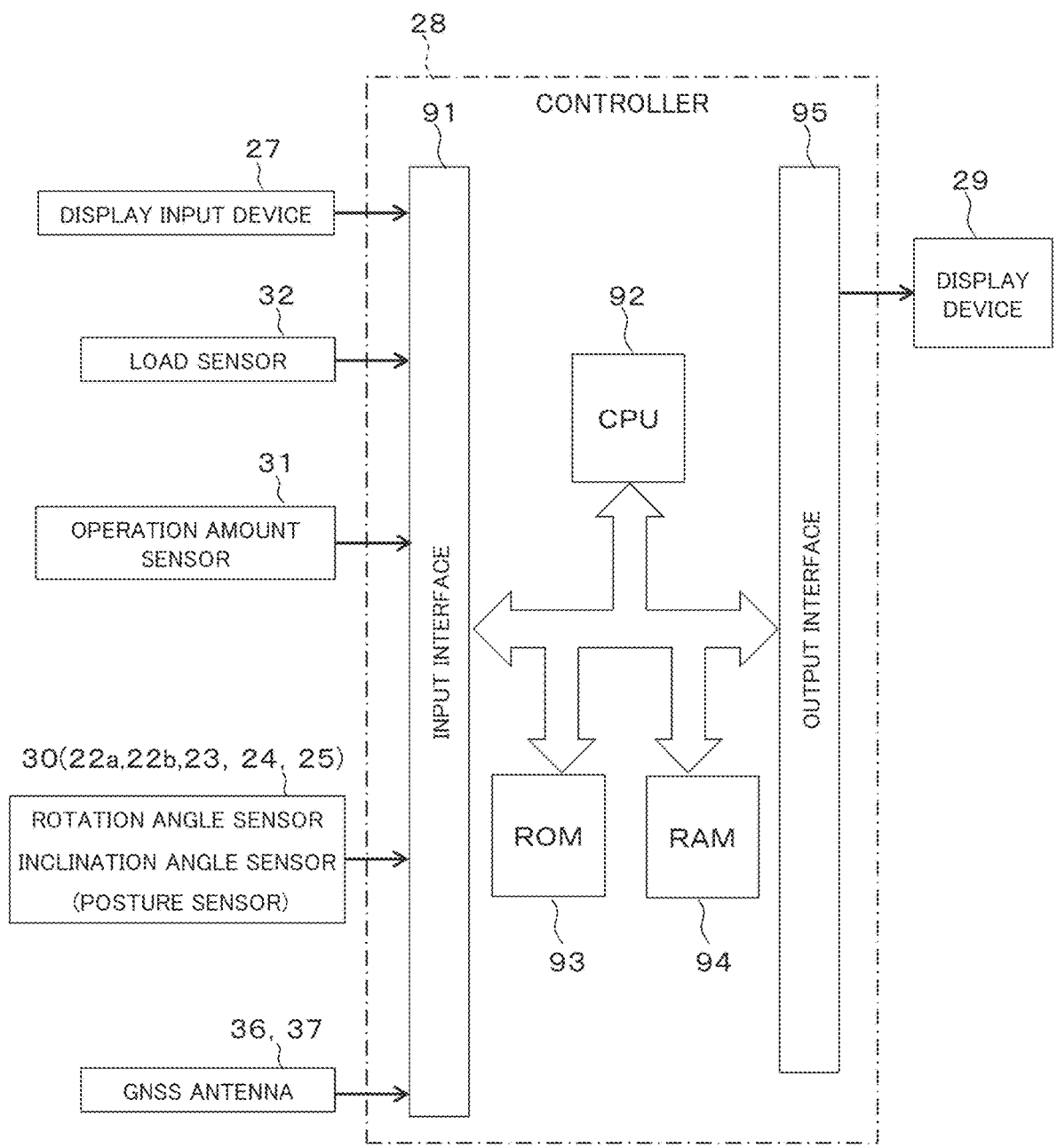
FIG. 2 is a hardware configuration diagram of a controller.

FIG. 2 illustrates the hardware configuration of the controller 28. The controller 28 is a computer, and has an input section 91, a central processing unit (CPU) 92, which is a processor, a read-only memory (ROM) 93 and a random-access memory (RAM) 94, which are storage devices, and an output section 95.

Rotation angle sensors 23, 24, and 25 and inclination angle sensors 22a and 22b which are posture sensors 30, an operation amount sensor 31, load sensors 32, and a display input device 27 are connected to the input section 91. The input section 91 receives inputs of analog signals or digital signals output from each connected instrument.

The display input device 27 includes a plurality of switches, for example, and outputs, to the controller 28, a setting signal for setting of a screen on the display device 29 or for other purposes depending on operations of the switches. A pointing device such as a touch panel, a keyboard, a microphone or the like can also be utilized as the display input device 27.

In the present embodiment, the posture sensors 30 (the rotation angle sensors 23, 24, and 25 and inclination angle sensors 22a and 22b), the operation amount sensor 31 and the load sensors 32 are included as a plurality of sensors that sense a plurality of parameters to serve as indicators of operation contents performed via the operation device 17.

The load sensor 32 is attached to each of the boom cylinder 9, the arm cylinder 10 and the bucket cylinder 11, and senses a load pressure of each cylinder 9, 10, or 11. In the present embodiment, a pressure sensor that senses a load pressure of each cylinder 9, 10, or 11 is utilized as the load sensor 32, and a sensing value of each pressure sensor is output to the controller 28. Note that, as the load sensor 32, the load pressure sensors for the cylinders can be replaced by a sensor that senses a state quantity that changes depending on a work load applied to the bucket 8, that is, a load of the work implement 3. For example, a delivery pressure of a hydraulic pump may be sensed by a pressure sensor, and the work load of the work implement 3 can be estimated from the sensing value. In addition, the mass of an object loaded in the bucket 8 may be sensed by a mass sensor, the acceleration of the bucket 8 may be sensed by an acceleration sensor, and the work load can be estimated using an equation of motion based on those sensing values and the dimensional data and mass data of the work implement 3 stored in the storage section 93.

The operation amount sensor 31 is attached to the operation device 17, and senses a state quantity indicating an operation amount of the operation device 17. The operation amount sensor 31 in the present embodiment senses an operation direction and operation amount of each of the first and second operation levers and the first and second travel levers, and outputs the sensing value to the controller 28. The operation device 17 in the present embodiment is of a hydraulic pilot type that generates pilot pressure (operation signal) that acts on flow control valves for the hydraulic actuator 9, 10, 11, and 15 and the like, and a pressure sensor that senses a pilot pressure output through an operation of each lever can be utilized as the operation amount sensor 31. Note that the operation amount sensor 31 is not limited to the pressure sensor, but a sensor that can sense an operation direction/operation amount of each lever can replace the pressure sensor. For example, a positional sensor, for example, a rotary encoder, that senses rotational displacement of each lever can also sense an operation direction/operation amount of each lever.

Figure 3:
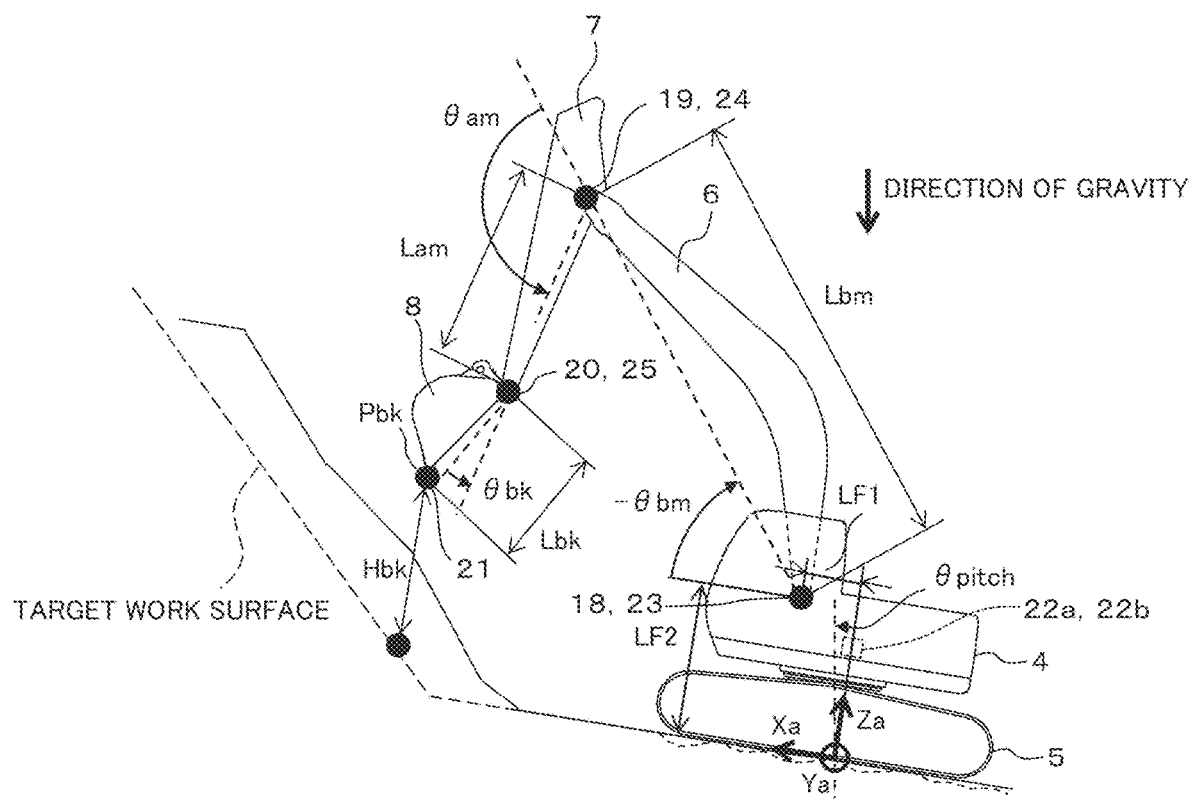
FIG. 3 is a diagram illustrating the coordinate system and dimensions of the hydraulic excavator in a simplified manner.

The rotation angle sensors 23, 24, and 25 and inclination angle sensors 22a and 22b, which are the posture sensors 30, sense state quantities that can define the posture of the work implement 3, and output the sensing values to the controller 28. Here, details of the rotation angle sensors 23, 24, and 25 and inclination angle sensors 22a and 22b are explained with reference to FIG. 3. FIG. 3 is a diagram illustrating the coordinate system {Xa, Ya, Za} and dimensions of the hydraulic excavator 1 in a simplified manner.

In FIG. 3, the length Lbm of the boom 6 is the length from the boom pin 18 to the arm pin 19. The length Lam of the arm 7 is the length from the arm pin 19 to the bucket pin 20. The length Lbk of the bucket 8 is the length from the bucket pin 20 to a bucket claw tip 21. Here, the coordinates of the boom pin 18 in the machine main body coordinate system {Xa, Ya, Za} is defined as (LF1, 0, LF2).

The inclination angle sensors 22a and 22b are attached to the machine main body 2, and sense the roll angle θroll (the angle about the Xa axis) and pitch angle θpitch (the angle about the Ya axis) of the upper swing structure 4. Note that although the yaw angle θyaw (the angle about the Za axis) of the upper swing structure 4 can be sensed based on the rotation angle of the swing motor in the swing drive device 13, a dedicated sensor may be attached to sense the yaw angle θyaw similar to those for the roll angle and pitch angle.

The angle θbm of the boom 6 is sensed by the first rotation angle sensor 23 attached to the upper swing structure 4 (boom pin 18) measuring rotation of the boom 6 about the boom pin 18. Counterclockwise angles in FIG. 3 are defined as positive angles, and clockwise angles are defined as negative angles. The angle θam of the arm 7 is sensed by the second rotation angle sensor 24 attached to the boom 6 (arm pin 19) measuring rotation of the arm 7 about the arm pin 19. The angle θbk of the bucket 8 is sensed by the third rotation angle sensor 25 attached to the arm 7 (bucket pin 20) measuring rotation of the bucket 8 about the bucket pin 20. For example, rotary potentiometers can be utilized as these rotation angle sensors 23, 24, and 25.

Note that although, in this document, the case where the posture of the work implement 3 is calculated based on sensing values of the rotation angle sensors 23, 24, and 25 is explained, displacement sensors (for example, linear potentiometers) that sense strokes of the boom cylinder 9, arm cylinder 10, and bucket cylinder 11 may be included, and the posture of the work implement may be calculated based on changes of the stroke of each cylinder 9, 10, or 11 obtained from an output value from each of the displacement sensors.

Returning to FIG. 2, the ROM 93 is a recording medium that stores a control program for executing display control of the display device 29 including processes according to a flowchart mentioned below, various types of information required for execution of the flowchart, and the like. The CPU 92 performs predetermined calculation processes on signals taken in from the input section 91 and memories 93 and 94 according to the control program stored in the ROM 93. The output section 95 creates a signal for output corresponding to a result of calculation by the CPU 92 and outputs the signal to the display device 29 to thereby display a guide screen corresponding to a work pattern of the hydraulic excavator 1 on a screen of the display device 29.

Note that although the controller 28 in FIG. 2 includes semiconductor memories, which are the ROM 93 and RAM 94, as storage devices, any storage device in particular can replace them, and, for example, a magnetic storage device such as a hard disk drive may be included.

Figure 4:
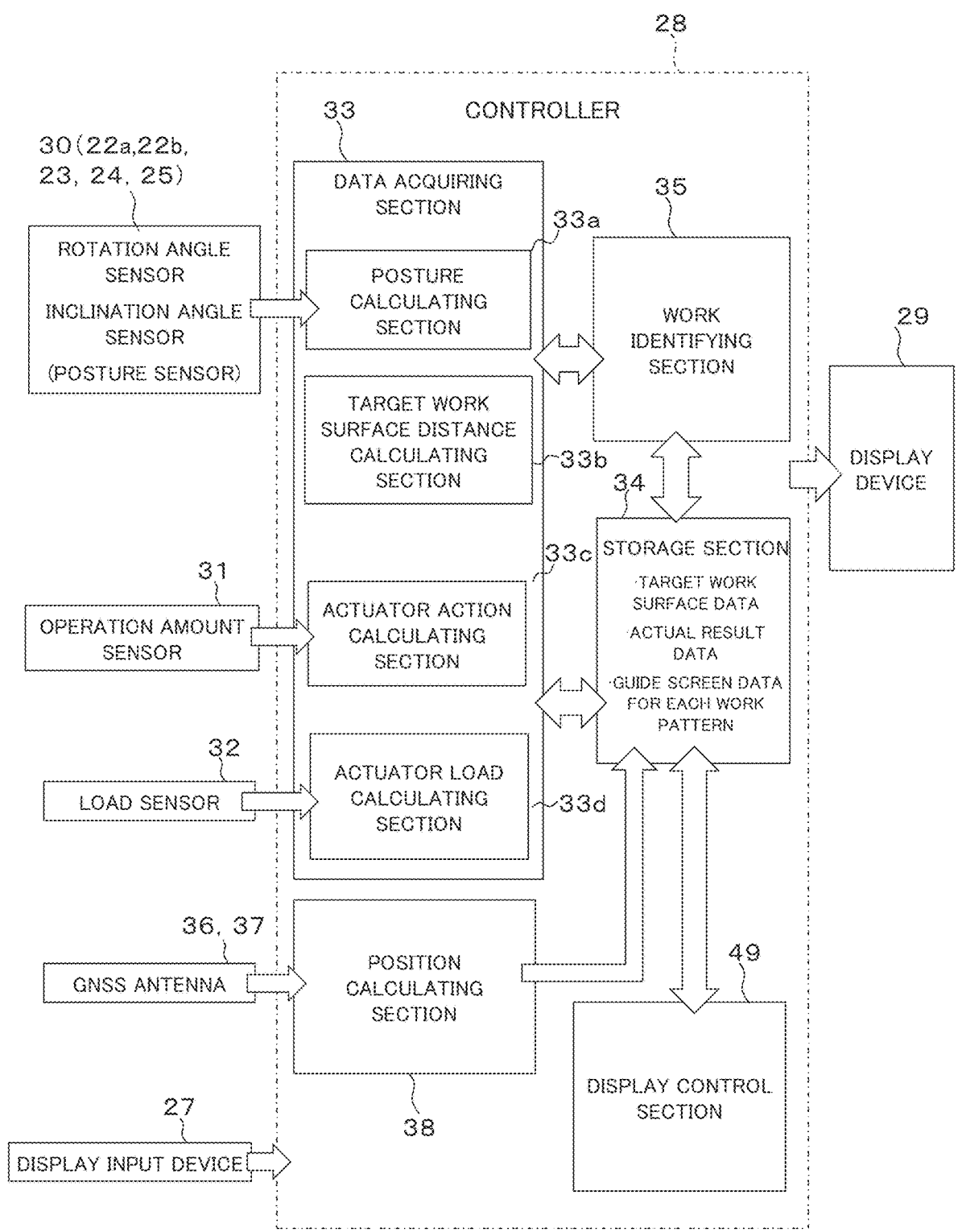
FIG. 4 is a functional block diagram of the controller.

FIG. 4 is a functional block diagram of the controller 28 according to the embodiment of the present invention. The controller 28 functions as a data acquiring section 33, a storage section 34, and a work identifying section 35. The storage section 34 corresponds to the ROM 93 and RAM 94.

The data acquiring section 33 is a section that executes a process of acquiring data indicating operation contents by an operator and frequency thereof (hereinafter, referred to as "operation content frequency data" in some cases), the operation contents being performed on the hydraulic excavator 1 in a period starting a predetermined time before a current time and ending at the current time, the operation content frequency data being acquired based on output values output from the plurality of sensors 30, 31, and 32 in the period.

The storage section 34 stores a plurality of guide screens each corresponding to one of a plurality of work patterns registered in advance as work patterns of the hydraulic excavator 1. As mentioned in detail below, six work patterns are registered in the present embodiment, which are (1) work stop pattern, (2) travel pattern, (3) normal excavation pattern, (4) slope-tamping pattern, (5) embanking pattern, and (6) loading pattern. Then, five guide screens are registered, which are (1) travel pattern guide screen, (2) normal excavation pattern guide screen, (3) slope-tamping pattern guide screen, (4) embanking pattern display screen, and (5) loading pattern guide screen.

In addition, the storage section 34 stores work implement dimensional data and construction data that indicates shapes or positions of construction subjects at a construction site defined in a design drawing. The work implement dimensional data includes the length Lbm of the boom 6, the length Lam of the arm 7, the length Lbk, width Wbk, bottom surface length Tbk, tip portion angle αbk of the bucket 8, and the boom pin coordinates (LF1, 0, LF2) that are explained in FIG. 3.

The work identifying section 35 identifies a current work pattern from the plurality of work patterns stored in the storage section 34 based on the operation content frequency data acquired by the data acquiring section 33. More specifically, the work identifying section 35 identifies the current work pattern from the plurality of work patterns stored in the storage section 34 based on features of the operation contents and their frequency of the operation content frequency data acquired by the data acquiring section 33. The controller 28 is programmed to select a guide screen corresponding to the work pattern identified by the work identifying section 35 from the plurality of guide screens stored in the storage section 34, and to output a signal to the display device 29 such that the selected guide screen is displayed.

The data acquiring section 33 includes a posture calculating section 33a, a target work surface distance-calculating section 33b, an actuator action-calculating section 33c, and an actuator load-calculating section 33d.

The posture calculating section 33a is a section that executes a process of calculating, based on output values of the posture sensors 30, the coordinates (Xbk, Ybk, Zbk) of the position Pbk of the bucket claw tip 21 in the machine main body coordinate system, together with the posture of the hydraulic excavator 1 including the work implement 3 (the postures of the boom, arm, bucket, upper swing structure, and lower track structure). Calculation of the position Pbk is executed according to the following Equations 1, 2, and 3 based on the boom pin coordinates (LF1, 0, LF2), the sensed angles θbm, θam, and θbk from the rotation angle sensors 23, 24, and 25 and the work implement dimensional data Lbm, Lam, and Lbk.

$$Xbk = LF1 + Lbm \cdot \cos(\theta bm) + Lam \cdot \cos(\theta bm + \theta am) + Lbk \cdot \cos(\theta bm + \theta am + \theta bk)$$ Equation 1:

$$Ybk = 0$$ Equation 2:

$$Zbk = LF2 - Lbm \cdot \sin(\theta bm) - Lam \cdot \sin(\theta bm + \theta am) - Lbk \cdot \sin(\theta bm + \theta am + \theta bk)$$ Equation 3:

Meanwhile, the position Pbk of the bucket claw tip 21 moves on an Xa-Za plane (referred to as a movement plane in some cases) in the machine main body coordinate system. Then, a cross-section on the Xa-Za plane in the construction data stored in the storage section 34 is retrieved, and the cross-section is defined as a target work surface (referred to as "target surface" in some cases). The target work surface is constituted by one line segment or a plurality of line segments, and the position of each line segment constituting the target work surface on the Xa-Za plane can be expressed by a linear function: $a[k]Xa + b[k]Za + c[k] = 0$ ($Xamin[k] \le Xa \le Xamax[k]$, $k = 1 \ldots n$, and n is the number of linear functions of the target work surface).

The target work surface distance-calculating section 33b is a section that executes a process of calculating the height Hbk from the target work surface to the position Pbk of the bucket claw tip 21 (referred to as the "target surface distance" in some cases) based on the position Pbk calculated by the posture calculating section 33a and the linear functions defining the target work surface, that is, the position of the target work surface. The height Hbk can be replaced also by the distance from the bucket claw tip 21 to the target work surface. The height Hbk is calculated by selecting a k-th line segment satisfying $Xamin[k] \le Xbk \le Xamax[k]$, and according to the following Equation 4, for example.

$$Hbk = Zbk - (-a[k]Xbk - c[k])/b[k]$$ Equation 4:

Note that although, in Equation 4, Hbk is acquired from the difference between Za coordinates of the target work surface and the position Pbk on the Xa-Za plane, Hbk may be acquired from the distance between a linear function (straight line) defining the target work surface and the position Pbk (point). In this case, Hbk is the shortest distance between the target work surface and the position Pbk.

The actuator action-calculating section 33c is a section that executes a process of determining actions of a plurality of actuators mounted on the hydraulic excavator 1 (specifically, the hydraulic cylinders 9, 10, and 11, the swing motor in the swing drive device 13, and the travel motors 15). As mentioned in detail below, in the present embodiment, whether or not each actuator is making an action is determined based on output values of the operation amount sensor 31 and a threshold set for each output value.

The actuator load-calculating section 33d is a section that executes a process of calculating a work load applied to the work implement 3 based on loads of the plurality of hydraulic cylinders (the plurality of actuators) 9, 10, and 11 calculated from the output values of the load sensors 32. By paying attention to this work load, it is possible to conclude whether or not a work by the work implement 3 (any work among work including loading, unloading, excavating, embanking, soil-dropping, and slope-tamping) is being performed actually. Note that work implement mass data including the masses, coordinates of the centers of gravity, and moments of inertia about the centers of gravity of the boom 6, arm 7, and bucket 8 mentioned above may be stored in advance in the storage section 34, and the work load may be calculated according to an equation of motion based on the work implement dimensional data and the work implement mass data.

Here, three types of data including the distance (the height Hbk) from the bucket claw tip 21 to the target work surface by the target work surface distance-calculating section 33b, the action determination regarding the plurality of actuators by the actuator action-calculating section 33c, and the work load of the work implement 3 by the actuator load-calculating section 33d are collectively referred to as "operational data."

Based on a plurality of pieces of operational data acquired in a certain control cycle (time of day) and a threshold set for each piece of operational data, the data acquiring section 33 categorizes the plurality of pieces of operational data acquired in the certain control cycle, and acquires a type of operation contents of the certain control cycle based on a categorization result of the operational data in the certain control cycle. The acquired type of operation contents is stored in the storage section 34. A control cycle for acquiring a type of operation content is preferably one second or two seconds, but other cycles can also be adopted.

For categorization of each piece of operational data, a threshold set for each piece of operational data is utilized, and each threshold is stored in the storage section 34. Two thresholds are set for the distance (the height Hbk) to the target work surface, and 2 [m] and 0 [m] are utilized as the thresholds in the present embodiment. "2" is a threshold for concluding whether a type of operation contents is one of an excavating operation, an embanking operation, and a slope-tamping operation, or is one of other operations. "0" is a threshold for concluding whether a type of operation content is an embanking operation or one of other operation. Based on these two thresholds, the data acquiring section 33 classifies values of Hbk into three. Specifically, those three are (A) the case of 2<Hbk, (B) the case of 0<Hbk≤2 and (C) the case of Hbk<0. Note that the thresholds can be changed to other values than 0 and 2. In addition, if more detailed classification of operation contents is required, three or more thresholds may be set.

One threshold is set for action determination regarding the plurality of actuators by the actuator action-calculating section 33c. In the present embodiment, whether or not each actuator is making an action is determined based on output values of the operation amount sensor 31 and a threshold set for each output value. Specifically, a minimum value of an operation amount (pilot pressure) of the operation device 17 at which a certain actuator starts making an action is defined as a threshold related to the operation amount of the certain actuator. If the output value of the operation amount sensor 31 to sense the operation amount of the certain actuator exceeds the threshold, it is determined that the certain actuator is making an action; on the other hand, if the output value is equal to or lower than the threshold, it is determined that the actuator is making no action. In the present embodiment, in action determination of the action-calculating section 33c, the operation direction and operation amount of each of the first and second operation levers and the first and second travel levers is sensed by the operation amount sensor 31; thereby, it is determined whether or not actions of traveling, swinging, boom raising (Bm raising), boom lowering (Bm lowering), arm crowding (Am pulling), arm dumping (Am pushing), bucket crowding (Bk pulling), and bucket dumping (Bk pushing) as indicated in the first row in the table of FIG. 5 are being made.

One threshold is set for the work load of the work implement 3 calculated by the actuator load-calculating section 33d. In the present embodiment, whether or not there is the work load is determined based on output values of the load sensor 32 and a threshold set for each output value. Specifically, if the output value of the load sensor 32 exceeds the threshold, it is determined that the work load is occurring; on the other hand, if the output value is equal to or lower than the threshold, it is determined that the work load is not occurring.

FIG. 5 is a figure illustrating an exemplary correspondence between categorization results of operational data and operation contents, and the data acquiring section 33 in the present embodiment identifies operation contents using this. The rightmost column in the table of FIG. 5 indicates "Operation Contents." A plurality of cells positioned to the left of "Operation Contents" indicate "o," "x," and "-." "o" indicates that the action, work load or target work surface distance defined in the first row is required for operation contents to be identified as the operation contents indicated in the rightmost cell. "x" indicates that they are not required, and "-" indicates that they are irrelevant. Accordingly, for example, in order for operation contents to be identified as "Travel Operation," required determination by the actuator action-calculating section 33c is that it is concluded that a "traveling" action being made, and it is concluded that the distance from the claw tip to the target work surface calculated by the target work surface distance-calculating section 33b is not "2 m or shorter to target surface," and not "at or lower than target surface," that is, it is concluded that the distance is more than 2 m apart from the target surface. In contrast, if it is categorized by the actuator action-calculating section 33c as that a traveling action is being made, and it is categorized by the target work surface distance-calculating section 33b as that the height Hbk is more than 2 m, operation contents at the time of day is identified as "Travel Operation."

In the table of FIG. 5, nine inputs in total including operation amounts of the operation device 17 related to "boom raising," "boom lowering," "arm pulling," "arm pushing," "bucket pulling," "bucket pushing," "swinging (the swing drive device 13 swing-driving the upper swing structure 4)," and "traveling (the travel motor 15 driving the lower track structure 5)," and "work load" are classified into two values based on one threshold, and the "height Hbk" is classified into three values based on two thresholds. Then, operation contents are classified into twelve types, (1) "Stop," (2) "Excavating Operation," (3) "Travel Operation," (4) "Swing Operation," (5) "Raising Operation," (6) "Lowering Operation," (7) "Loading Operation," (8) "Unloading Operation," (9) "Embanking Operation," (10) "Soil-Dropping Operation," (11) "Slope-Tamping Operation," and (12) "Other Operations (no conclusion) (not illustrated)." (1) In "Stop," none of the actuators are operated by the operation device 17. (2) In "Excavating Operation," an arm crowding operation is performed near and above the target work surface. (3) In "Travel Operation," operated actuators include the travel motor 15. (4) In "Swing Operation," operated actuator is only the motor in the swing drive device 13. (5) In "Raising Operation," a boom raising operation is performed without swinging and traveling. (6) In "Lowering Operation," a boom lowering operation is performed without swinging and traveling. (7) In "Loading Operation," both a swinging operation and a boom raising operation are included. (8) In "Unloading Operation," both a swinging operation and a boom lowering operation are included. (9) In "Embanking Operation," a bucket-dumping operation is performed below the target surface. (10) In "Soil-Dropping operation," a bucket-dumping operation is performed at a height more than 2 m above the target surface. (11) In "Slope-Tamping Operation," a boom lowering operation is performed without an arm operation near and above the target surface. (12) In "Other Operations," none of the above-mentioned (1) to (11) apply.

The data acquiring section 33 acquires, from the storage section 34, operation contents performed by an operator on the hydraulic excavator 1 in a designated period starting a predetermined time before a current time and ending at the current time, for example, a period starting several seconds before a current time and ending at the current time, and acquires operation content frequency data indicating the frequency of operation contents performed in the designated period (hereinafter, referred to as "current operation content frequency data" in some cases). The current operation content frequency data may be any data as long as it allows identification of the number of times (frequency) of each type of operation contents that appears in a designated period, and, for example, can be stored in a histogram format in which data is organized in bins that store operation contents type-by-type. The designated period preferably is set as a period in which operation contents in at least two control cycles can be acquired.

Note that the current operation content frequency data may not be acquired from operation contents in a "designated period," but may be acquired from operation contents of the latest N times acquired in predetermined control cycles. The number of times N is preferably an integer equal to or larger than 2 and equal to or smaller than 10 in terms of ensuring the precision of identifying work patterns and the timeliness of screen changes.

FIG. 6 is a figure schematically illustrating a procedure of creating histograms regarding operation content frequency data indicating operation contents performed on the hydraulic excavator 1 and frequency thereof in a designated period that spans back to predetermined time before a current time. In the present embodiment, as illustrated, the "cycle of acquiring operation contents" and the "cycle of acquiring operation content frequency data" are set to 1 second, and the "designated period" is set to range from five control cycles before a current time to the current time. Thereby, one histogram is defined by operation contents of six operations in total. A value equal to or smaller than 1 indicated above each bin is a value obtained by counting the number of times of appearance of a corresponding type among operation contents in a designated period, and dividing the counted number by the total (that is, 6) of the operation contents in the designated period. In this manner, a histogram with the total sum of 1 and the number of elements equal to the number of the types of operation contents is constructed in a vector format, and this is defined as the operation content frequency data. Note that the cycle of acquiring operation contents and the cycle of acquiring the operation content frequency data may be made different from each other.

Meanwhile, the storage section 34 stores actual result data of operation content frequency data (referred to as "past operation content frequency data" or simply "actual result data" in contrast to current operation content frequency data in some cases) together with a work pattern performed at the time of acquisition of each piece of the actual result data. This actual result data functions as a classifier for work patterns at the work identifying section 35. Association between the actual result data and work patterns can be performed manually. As a method for association (also referred to as "labelling"), for example, there is a method in which a human associates work patterns with past operation content frequency data based on work video images of a hydraulic excavator acquired in synchronization with past operation contents. Note that one obtained by associating, with work patterns, actual result data in a period using, as training data, actual result data in another period in which work patterns are associated by a human can also be utilized as a classifier. This means that, as a classifier, not only one generated based on actually measured data, but also one generated by statistical approaches, one obtained by combining both of them, or the like can be utilized.

The work identifying section 35 executes a process of searching actual result data in the storage section 34 for data that matches or is similar to current operation content frequency data acquired by the data acquiring section 33 in terms of operation contents and frequency thereof, and identifying a current work pattern based on a work pattern allocated to actual result data related to a result of the search.

Figure 7:
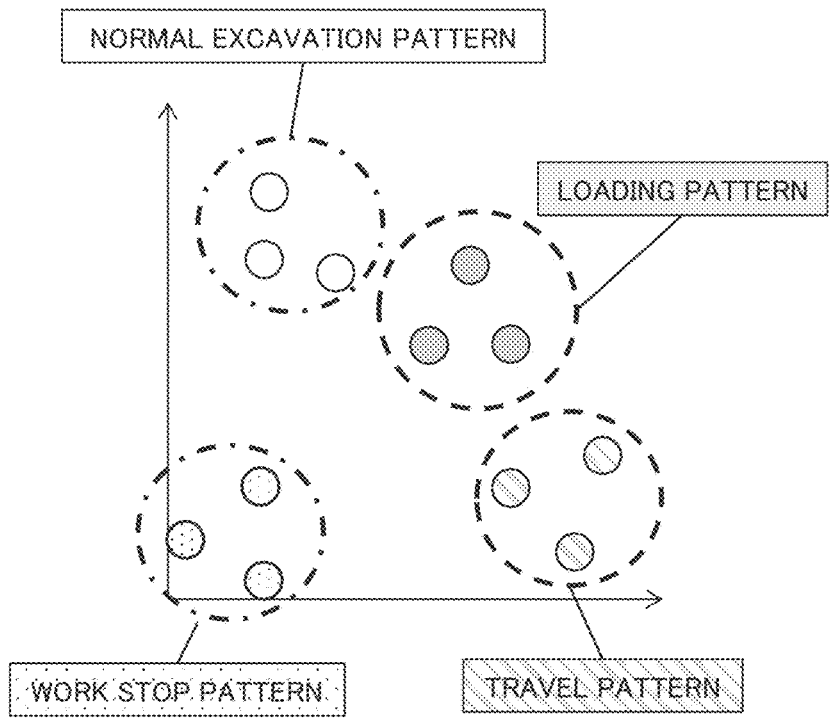
FIG. 7 is a figure schematically illustrating classification of work patterns using the k-nearest neighbor algorithm.
Figure 8:
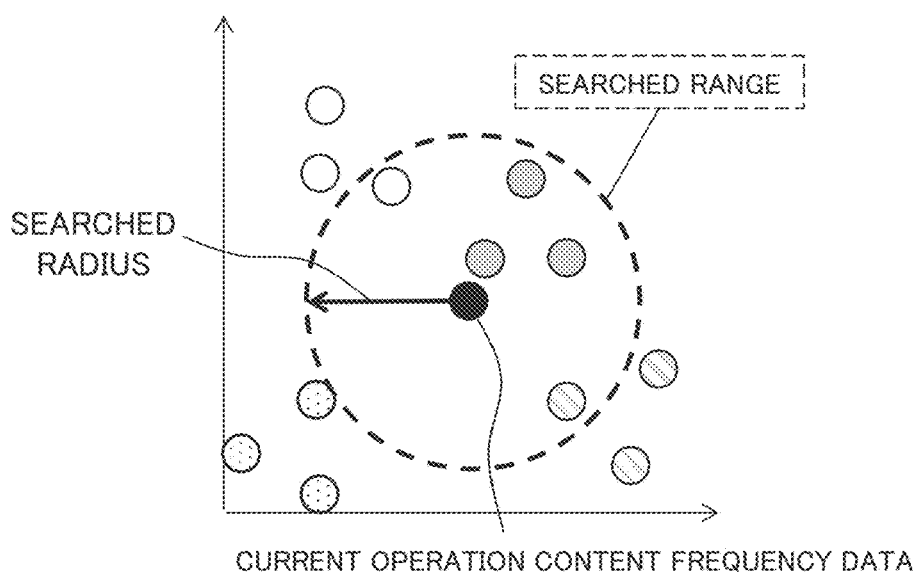
FIG. 8 is a figure schematically illustrating classification of work patterns using the k-nearest neighbor algorithm.

Specific methods of identifying a current work pattern by comparison between current operation content frequency data and actual result data include the k-nearest neighbor algorithm, and this is adopted in the present embodiment. FIG. 7 and FIG. 8 are figures schematically illustrating one example in which classification of work patterns by the work identifying section 35 is performed using the k-nearest neighbor algorithm. When there are twelve types of operation contents, (1) stop, (2) excavating operation, (3) travel operation, (4) swing operation, (5) boom raising operation (raising operation), (6) boom lowering operation (lowering operation), (7) loading operation, (8) unloading operation, (9) embanking operation, (10) soil-dropping operation, (11) slope-tamping operation, and (12) other operations (no conclusion), operation content frequency data is expressed by a twelve-dimensional vector Xvec=[x[1], x[2], . . . , x[12]], which is a combination of frequencies x[i] (i= 1, 2, . . . , 12) of the respective operation contents. The twelve circles in FIG. 7 indicate the terminal points of respective vectors of actual result data (past operation content frequency data).

In addition, there are the following six work patterns: (1) the "work stop pattern" which is a work pattern in which all the levers of the operation device 17 is at their neutral positions and working is stopped; (2) the "travel pattern" which is a work pattern in which a travel operation is performed by a travel lever of the operation device 17; (3) the "normal excavation pattern" which is a work pattern in which formation of a target work surface is performed by the operation device 17 causing the work implement 3 to make an excavation action; (4) the "slope-tamping pattern" which is a work pattern in which a face of slope is hit by a flat surface of the bucket 8 to compact earth by repeated boom 6 lowering actions caused by the operation device 17; (5) the "embanking pattern" which is a work pattern in which a target work surface is formed with earth and sand that are accumulated by the operation device 17 causing the bucket 8 to make a soil-dropping action; and (6) the "loading pattern" which is a work pattern in which earth and sand are loaded onto a loading vehicle such as a dump truck by a swing boom raising action caused by the operation device 17. Among them, in the example of FIG. 7, four patterns, the normal excavation pattern, work stop pattern, loading pattern, and travel pattern, are indicated, and four circles (actual result data) in each area encircled by a circular alternate long and short dash line or a dotted line are assumed to have the same work patterns.

The twelve circles illustrated in FIG. 8 are the same as those in FIG. 7, and four types of work patterns same as those in FIG. 7 are allocated to them. If current operation content frequency data is classified as one work pattern by the work identifying section 35, the current operation content frequency data is placed in a twelve-dimensional space as indicated by a black circle in FIG. 8. Then, the searched radius is gradually expanded with the placed current operation content frequency data as its center, and the k (in this case, k=5) nearest pieces of past operation content frequency data (actual result data) around the current operation content frequency data are searched for. Then, among work patterns that are labeled to the k pieces of past operation content frequency data, the work pattern with the largest data count is classified as a current work pattern. In the example of FIG. 8, since the largest data count is that of the loading pattern with three circles being present in the searched radius, the current work pattern is the loading pattern.

Note that if there are a plurality of work patterns whose data counts in the search result are the same, the average of distances of a plurality of pieces of actual result data of each single work pattern (the same label) to the current operation content frequency data is determined, and the work pattern with the smallest average value can be classified as the current work pattern. In addition, a threshold may be set for the searched radius, and if k pieces of past operation content frequency data are not found in the threshold searched radius, calculation in the process cycle may be ended, giving a result "not classified."

In FIG. 4, the controller 28 includes a position calculating section 38 and a display control section 49. The position calculating section 38 is a section that executes a process of calculating the three-dimensional position (Xg, Yg, Zg) and three-dimensional posture ($\varphi$roll, $\varphi$pitch, $\varphi$yaw) of the machine main body 2 (the hydraulic excavator 1) in the global coordinate system {X, Y, Z} based on signals received from the antennae 36 and 37. The three-dimensional position and three-dimensional posture difference-calculated by the position calculating section 38 are stored in the storage section 34 as appropriate, and are utilized for calculation of other sections (for example, the posture calculating section 33$a$) in the controller 28 as required.

The posture calculating section 33$a$ calculates the position Pgbk=(Xgbk, Ygbk, Zgbk) of the bucket claw tip 21 in the global coordinate system based on the three-dimensional position and three-dimensional posture of the machine main body 2 in the global coordinate system input from the position calculating section 38, and the coordinate of the position Pbk of the bucket claw tip 21 in the machine main body coordinate system.

The display control section 49 is a section that executes a process of selecting a guide screen corresponding to a work pattern identified by the work identifying section 35 from the storage section 34 and displaying the guide screen on the display device 29 and a process of acquiring, from the storage section 34 as appropriate, variable information (every piece of variable information on each guide screen including cumulative operational time, the amount of remaining fuel, a distance to target work subjects, the number of times of slope-tamping operations, and the like that are mentioned below) in information on the guide screen displayed on the display device 29 and displaying the acquired information. The variable information acquired by the display control section 49 is displayed on the guide screen on the display device 29. The display control section 49 executes not only the process of acquiring information from the storage section 34, but also a process of calculating variable information based on the acquired information. Information that the display control section 49 acquires from the storage section 34 is different for each guide screen, that is, for each work pattern, and is switched every time the guide screen is changed. Note that it is assumed that variable information on the guide screen in the present embodiment is entirely stored in the storage section 34.

Figure 9:
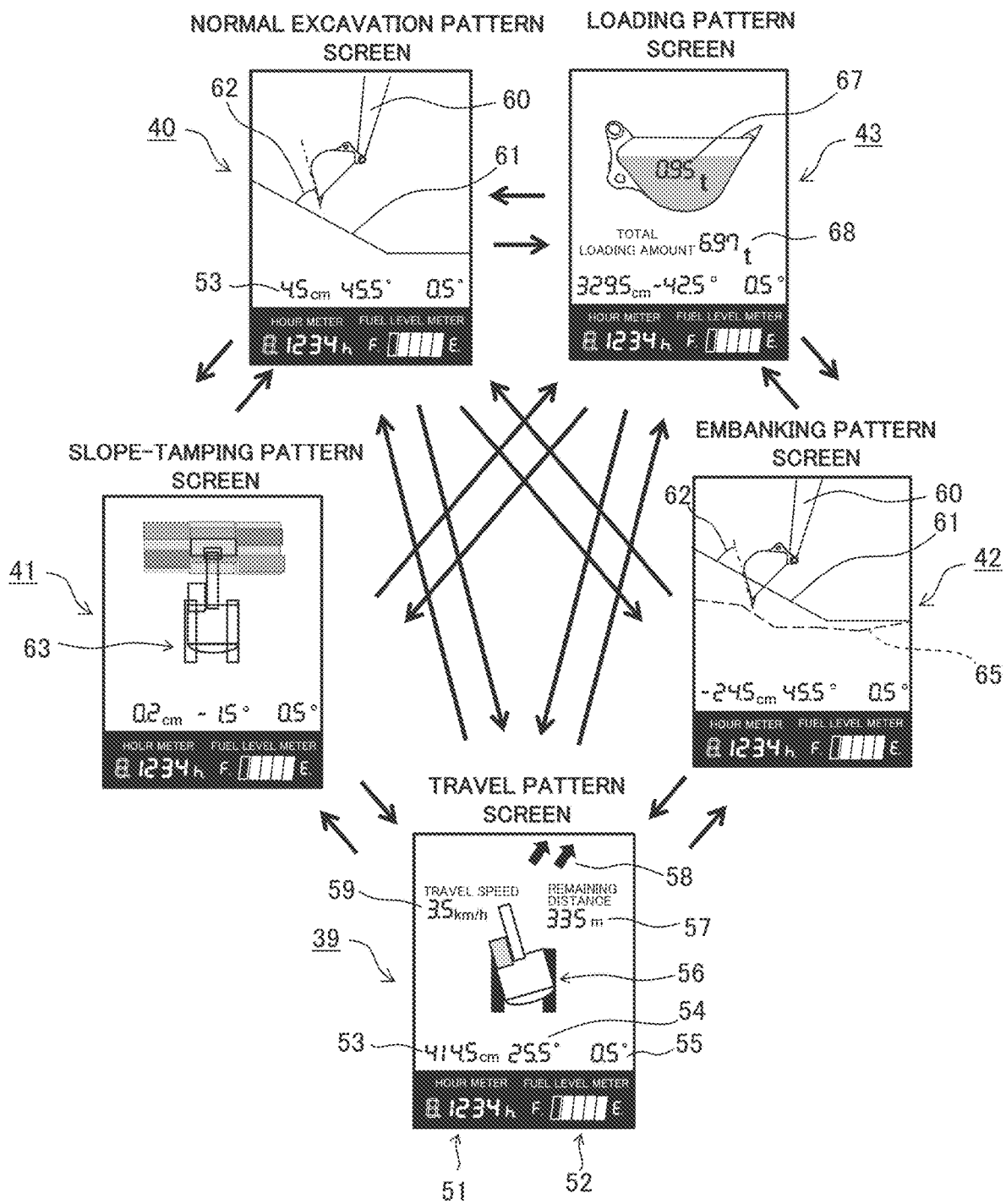
FIG. 9 illustrates five guide screens and a transition diagram illustrating transitions among them according to the embodiment of the present invention.

Next, five guide screens (also referred to as "display screens") stored in the storage section 34 in the present embodiment are explained in detail. FIG. 9 is a figure illustrating transitions among a plurality of display screens on the display device 29. As illustrated in this figure, there are five types of display screens registered in the storage section 34, which are a travel pattern display screen 39, a normal excavation pattern display screen 40, a slope-tamping pattern display screen 41, an embanking pattern display screen 42 and a loading pattern display screen 43. An arrow placed between two display screens indicates that a transition is possible from one display screen on the starting point side of the arrow to the other display screen on the terminal point side of the arrow. Although, in the example of FIG. 9, bidirectional transitions between the slope-tamping pattern screen 41 and the embanking pattern screen 42 are not possible, it may also be configured to make the transitions possible.

Each of the screens 39 to 43 has, as common display sections, an hour meter display section 51 on which cumulative operational time is displayed, a fuel level meter display section 52 on which an amount of remaining fuel is displayed, a target work surface distance display section 53 on which the distance Hbk from the claw tip 21 to the closest target work surface that has been calculated by the target work surface distance-calculating section 33$b$ is displayed, a swing angle display section 54 on which a swing angle (yaw angle $\theta$yaw) of the upper swing structure 4 relative to the lower track structure 5 that has been calculated by the posture calculating section 33$a$ is displayed, and an inclination angle display section 55 on which an inclination angle of the machine body 2 that has been calculated by the posture calculating section 33$a$ is displayed. Note that, for the sake of simplification, in FIG. 9, the reference characters 51 to 55 of the common display sections are given only in the travel pattern display screen 39.

On the travel pattern display screen 39, a top view 56 of the hydraulic excavator 1 placed at the approximately center of the screen, a remaining distance 57 to a target work subject (destination) set in advance, an arrow 58 indicating the direction of the target work subject using the current location of the hydraulic excavator 1 as a reference point, and a current travel speed 59 of the hydraulic excavator 1 are displayed. The remaining distance to and direction (arrow) of the target work subject are calculated by the display control section 49 from the three-dimensional position of the target work subject and the three-dimensional position (Xg, Yg, Zg) of the hydraulic excavator 1 in the global coordinate system. The upper swing structure 4 displayed in the top view of the hydraulic excavator 1 on the screen swings in line with the actual swing angle.

On the normal excavation pattern display screen 40, at least a side view 60 of part of or the entire hydraulic excavator 1 including the bucket (the tip portion of the work implement) 8 and a cross-sectional shape 61 of a target work surface near the claw tip 21 are displayed. In the present embodiment, furthermore, an angle 62 formed between the bucket bottom surface and the target work surface and the height (Hbk) 53 of the bucket claw tip 21 from the target work surface are displayed as information indicating the positional relation between the hydraulic excavator 1 and the target work surface. Note that the side view of the bucket 8 on the screen is displayed in line with actual operator operations.

On the slope-tamping pattern display screen 41, at least a top view 63 of part of or the entire hydraulic excavator 1 including the bucket 8 is displayed. In the present embodiment, furthermore, a slope-tamped area on a face of slope (hereinafter, referred to as "area information") and the number of times slope-tamping has been performed (hereinafter, referred to as "number-of-times information") are displayed.

The area information of slope-tamping can be calculated for example from the claw tip position Pgbk in the global coordinate system at the time when the bucket 8 touches the ground in the slope-tamping, the shape of an area at which the bucket 8 touches the ground in the slope-tamping, and the dimension of the area as measured using the claw tip position Pgbk as a reference point. The shape and dimension of the area are preferably decided based on the shape of the bucket 8, and, in the example of FIG. 9, are defined based on the shape (rectangle) of the bucket bottom surface.

The number-of-times information of slope-tamping can be calculated from the number of times it has been determined, based on operational data at the data acquiring section 33, that a slope-tamping operation is performed. The number of times may be displayed as a numerical value on the screen, but, in the present embodiment, is displayed in a color in terms of improving the visibility of the number of times for an operator. Methods of displaying of the number of times in a color for example include a method of changing the brightness of the color of the area in which slope-tamping has been performed (for example, darkening the color as the number of times of slope-tamping increases) and a method of changing the color itself, and the former is adopted in the present embodiment.

Note that it is preferably configured to be able to delete the area information and number-of-times information of slope-tamping by pressing a reset button on the display input device 27. In addition, the top view of the hydraulic excavator 1 on the screen is displayed in line with actual operator operations.

On the embanking pattern display screen 42, at least the side view 60 of part of or the entire hydraulic excavator 1 including the bucket 8 and the cross-sectional shape 61 of a target work surface near the claw tip 21 are displayed. In the present embodiment, furthermore, the angle 62 formed between the bucket bottom surface and the target work surface and the height (Hbk) 53 of the bucket claw tip 21 from the target work surface are displayed as information indicating the positional relation between the hydraulic excavator 1 and the target work surface. In addition, a plurality of coordinates in Xa direction among the coordinates of the lowest points in the case where the bucket claw tip 21 entered below the target work surface are stored, and a virtual work surface 65 obtained by linking the plurality of lowest points with a line segment is displayed. The virtual work surface 65 indicates a current ground surface, that is, a current embanking situation.

Note that it is preferably configured to be able to delete the virtual work surface 65 by operating a reset button on the display input device 27. In addition, the side view 60 on the screen is displayed in line with actual operator operations.

The loading pattern display screen 43 is displayed when a type of operation contents is "stop" or "loading operation." On the display screen 43, a loading amount 67 of the bucket 8, and the total loading amount (cumulative loading amount) 68 of the bucket 8 are displayed. The loading amount 67 can be calculated from a work load acquired by the actuator load-calculating section 33d. The total loading amount 68 can be calculated by determining that there is a loading (soil-dropping) operation when the work load that is equal to or higher than a threshold becomes lower than the threshold, and adding up the loading amount 67 (immediately preceding loading amount) of the bucket 8 calculated when the work load is equal to or higher than the threshold every time it is determined that there is a loading operation. Note that it is preferably configured to be able to delete the total loading amount 68 by operating a reset button on the display input device 27.

Figure 10:
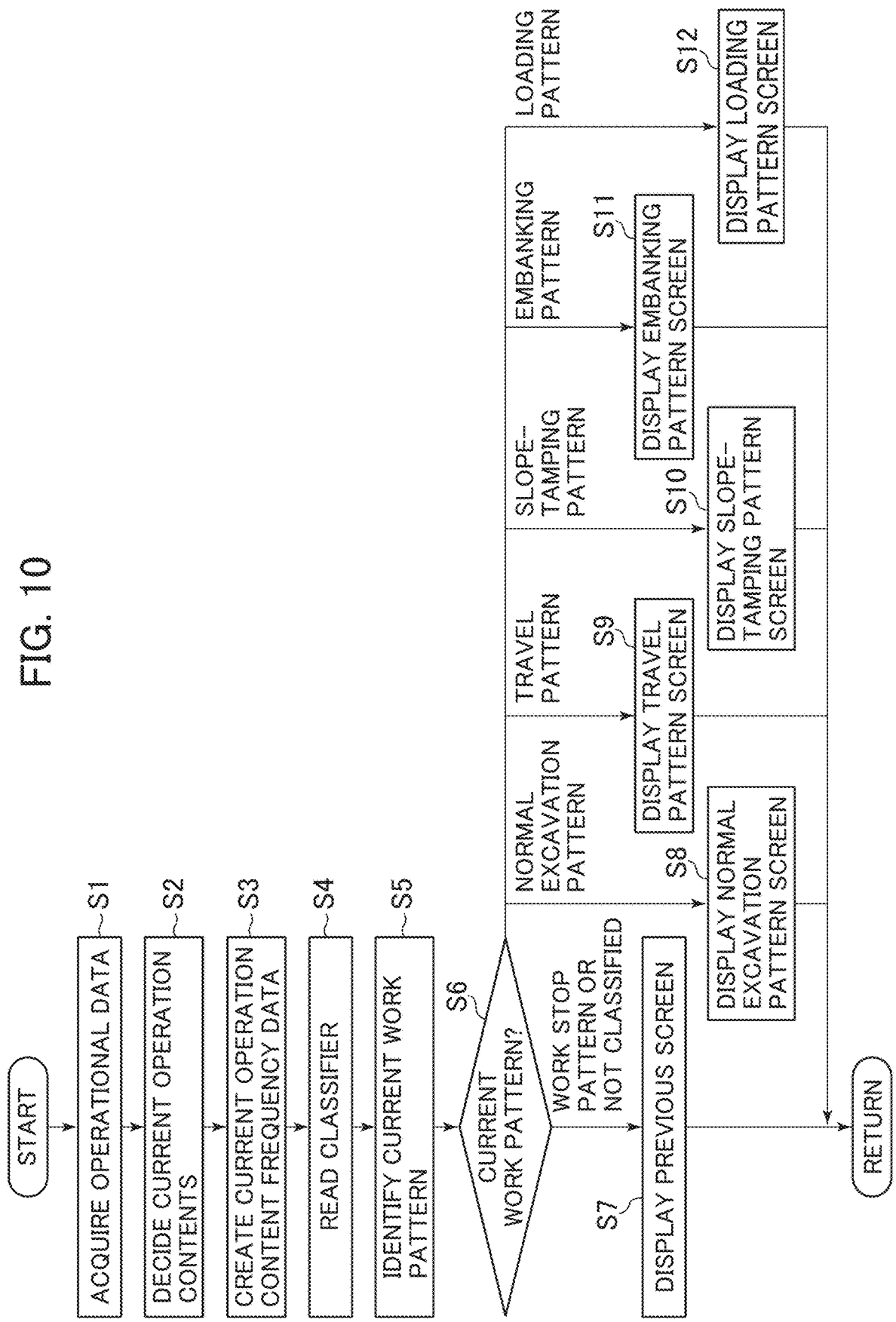
FIG. 10 is a flowchart illustrating a flow in which the controller decides one guide screen to be displayed on a display device 29.

FIG. 10 is a flowchart illustrating a flow in which the controller 28 decides one screen to be displayed on the display device 29. This flowchart is started when an operator puts an engine key (not illustrated) into a keyhole and turns it to the start position, and an engine (not illustrated) starts. Note that once the process is started by starting the engine, processes at and after Step S1 are repeated in a predetermined control cycle until the engine is stopped.

At Step S1, using the target work surface distance-calculating section 33b, actuator action-calculating section 33c, and actuator load-calculating section 33d, the data acquiring section 33 acquires current operational data of the hydraulic excavator 1, that is, the distance (Hbk) from the bucket claw tip 21 to a target work surface, operation amounts for the plurality of hydraulic actuators 9, 10, 11, 13, and 15, and a work load of the work implement 3 (load pressures of the hydraulic cylinders 9, 10, and 11).

At Step S2, the data acquiring section 33 decides a current operation content based on the operational data acquired at Step S1, the magnitude relation of the thresholds mentioned before set for respective pieces of operational data, and the table of FIG. 5, and stores a result of the decision in the storage section 34. For example, if it is categorized as that there is a traveling action (o for "Travel" in FIG. 5) by the actuator action-calculating section 33c, and that the height Hbk exceeds 2 m above the target work surface by the target work surface distance-calculating section 33b (x for both "2 m or shorter to target surface" and "At or lower than target surface" in FIG. 5), the data acquiring section 33 identifies "Travel Operation" as a current operation content, and stores a result of the identification in the storage section 34 as the current operation content.

At Step S3, the data acquiring section 33 acquires, from the storage section 34, operation contents that has been performed on the hydraulic excavator 1 in a designated period starting predetermined time before a current time and ending at the current time (here, a period starting five cycles before a current time and ending at the current time), and creates current operation content frequency data. For example, when operation contents in a period starting two cycles before a current time and ending at the current time are "Travel," and operation contents in a period starting five cycles before the current time and ending at three cycles before the current time are "Stop," a histogram which is the same as the one in the case of t=3 in FIG. 6 is created as current operation content frequency data.

At Step S4, the work identifying section 35 reads in a work pattern classifier (the classifier schematically explained in FIG. 7) stored in the storage section 34. Then, at Step S5, the current operation content frequency data created at S3 is placed in the twelve-dimensional space of the classifier read in at Step S4, and a current work pattern is identified using the k-nearest neighbor algorithm based on work patterns associated with actual result data present near the current operation content frequency data. For example, if k=5, and the work patterns of three pieces of actual result data that are present in the searched radius are the travel pattern, the current work pattern is identified as the travel pattern. In this manner, in the present embodiment, even if an operator does not particularly instruct the display device 29 to change the screen, a current work content is estimated based on the history of operation contents performed in a period starting a predetermined period before a current time and ending at the current time and a guide screen suited to the estimated work content can be automatically displayed on the display device 29.

At Step S6, the display control section 49 concludes what the work pattern identified at Step S5 is. Here, if the work pattern identified at S5 is the work stop pattern or none of the six patterns are identified, the process proceeds to Step S7, and a guide screen for a work pattern identified in a previous control cycle is displayed. Note that if the process reaches Step 7 in the first control cycle after the engine is started, a guide screen defined as an initial value, for example, the normal excavation pattern screen 40, is displayed.

If the work pattern identified at S5 is the normal excavation pattern, the process proceeds to Step S8, and the normal excavation pattern screen 40 is displayed on the display device 29. Since, on the normal excavation pattern display screen 40, the side view 60 of the bucket 8, the cross-sectional shape 61 of the target work surface, and the height (Hbk) of the bucket claw tip 21 from the target work surface are displayed, the positional relation between the claw tip 21 and the cross-sectional shape 61 can be grasped easily, and excavation along the target work surface becomes easy to perform. In addition, since the angle 62 formed between the bucket bottom surface and the target work surface is displayed, the angle of the bucket relative to the target work surface can be kept the same easily.

If the work pattern identified at S5 is the travel pattern, the process proceeds to Step S9, and the travel pattern screen 39 is displayed on the display device 29. On the travel pattern display screen 39, the top view 56 of the hydraulic excavator 1, the remaining distance 57 to the target work subject, and the arrow 58 indicating the direction of the target work subject are displayed. Accordingly, by matching the forward-backward direction of the lower track structure 5 with the direction of the arrow 58, it becomes possible to reach the target work subject with the shortest distance. In addition, since the remaining distance 57 is displayed, it becomes possible to prevent the hydraulic excavator 1 from being stopped at a wrong place.

If the work pattern identified at S5 is the slope-tamping pattern, the process proceeds to Step S10, and the slope-tamping pattern screen 41 is displayed on the display device 29. On the slope-tamping pattern display screen 41, the top view 63 of the bucket 8 is displayed, and an area of the face of slope in which slope-tamping has been performed, and the number of times the slope-tamping has been performed are displayed. Thereby, since it becomes possible to visually grasp the area in which slope-tamping has been performed and the number of times the slope-tamping has been performed and to easily grasp the work progress, it becomes possible to make an attempt to achieve uniform slope-tamping, and additionally to improve the efficiency of slope-tamping work.

If the work pattern identified at S5 is the embanking pattern, the process proceeds to Step S11, and the embanking pattern screen 42 is displayed on the display device 29. On the embanking pattern display screen 42, the side view 60 of the bucket 8, the cross-sectional shape 61 of the target work surface near the claw tip 21, the angle 62 formed between the bucket bottom surface and the target work surface, and the height (Hbk) 53 of the bucket claw tip 21 from the target work surface are displayed. In particular, in the present embodiment, since the virtual work surface 65 formed by linking, with a line segment, the coordinates of the lowest points in the case where the bucket claw tip 21 enters below the target work surface is displayed, the work progress can be visually grasped by comparing the virtual work surface 65 with the cross-sectional shape 61.

If the work pattern identified at S5 is the loading pattern, the process proceeds to Step S12, and the loading pattern screen 43 is displayed on the display device 29. On the loading pattern display screen 43, the loading amount 67 of the bucket 8, and the total loading amount (cumulative loading amount) 68 of the bucket 8 are displayed. It is possible to easily grasp the work progress by comparing the total loading amount 68 with a target loading amount, and additionally it is possible to generally know the remaining work amount by grasping the loading amount 67 per operation.

Upon completion of Steps S7 to 12, the process waits until the next control cycle, and when the next control cycle comes, the process at Step S1 is executed again.

In the above-mentioned embodiments, the hydraulic excavator 1 including the operation device 17 that outputs an operation signal corresponding to an operation amount, and the plurality of actuators 9, 10, 11, 13, and 15 that are driven based on the operation signal output from the operation device 17, includes: the plurality of sensors 30, 31, and 32 that sense a plurality of parameters to serve as indicators of operation contents performed via the operation device 17, the parameter including the operation amount of the operation device 17, the posture of the work implement 3 and load pressures of the hydraulic cylinders 9, 10, and 11; the display device 29 that displays a guide screen corresponding to a work pattern of the hydraulic excavator 1; and the controller 28 that controls screen display of the display device 29. The controller 28 includes the data acquiring section 33, the storage section 34, the work identifying section 35, and the display control section 49. Based on output values output from the plurality of sensors 30, 31, and 32 in a designated period starting a predetermined time before a current time and ending at the current time, the data acquiring section 33 acquires operation content frequency data indicating operation contents performed on the hydraulic excavator 1 and their frequency in the designated period. The storage section 34 stores the plurality of guide screens 39 to 43 each corresponding to one of a plurality of work patterns registered in advance as work patterns of the hydraulic excavator 1, and actual result data of operation content frequency data to which the work patterns are allocated. The work identifying section 35 searches the actual result data in the storage section 34 for actual result data that matches or is similar to the operation content frequency data acquired by the data acquiring section 33 in terms of operation contents and frequency thereof, and based on a work pattern allocated to the actual result data related to a result of the search, identifies a current work pattern. The display control section 49 selects, from the plurality of guide screens 39 to 43, a guide screen corresponding to the work pattern identified by the work identifying section 35. Then, the display device 29 displays the guide screen selected by the display control section 49.

In the present embodiment, by comparing past operation content frequency data (actual result data) for which work patterns are identified and current travel content frequency data, past operation content frequency data that matches or is similar to a current one in terms of operation contents and frequency thereof is identified, and a current work pattern is identified based on a work pattern associated with the identified past operation content frequency data. Since, in this method, a work pattern is identified taking into consideration not only contents of a current operation but also contents of a plurality of operations that were performed in a past period starting several seconds before a current time and ending at the current time, the precision of identifying a work pattern can be improved as compared with the case where a work pattern is identified based only on contents of a current operation. In work machines including hydraulic excavators, due to the natures of their works, it is not rare that a time series of actions (operations) appears repeatedly in a certain period in execution of the same type of works, and recognition of work patterns by the above-mentioned methods is particularly suitable for the work machines.

In addition, since in the present embodiment an operation by an operator of changing the guide screen every time work contents change is not required, and the guide screen is automatically changed as appropriate in line with changes in work contents, the burden of an operation of the operator can be reduced, and additionally it is possible to make an attempt to improve the work efficiency.

In addition, in the present embodiment, it is configured to be able to select one of a plurality of work patterns registered in advance in the storage section 34 as a current work pattern. Because of this, even if the relation between work patterns and operational data is further analyzed or guide screens become more complicated, and new work patterns are to be added, addition of the new work patterns is easy to perform.

Appendices

Contents of work patterns, and types and contents of guide screens that are utilized in the above-mentioned explanations are merely examples, and even if there are other work patterns and guide screens, such work patterns and guide screens can be utilized as appropriate if they do not deviate from the technical ideas of the present embodiments, and can be coped with within a range of design changes. In addition, although the above-mentioned respective actuators 9, 10, 11, and 15 and the like are explained assuming that they are of hydraulic types, they may be implemented similarly even if they are changed to electric actuators. In addition, the prime mover of the excavator 1 is not limited only to an engine, but an electric motor can also be utilized.

The numbers of thresholds utilized for categorization of operational data by the data acquiring section 33 in the above-mentioned explanations are merely examples. If more detailed classification of operation contents is required, thresholds can also be added as appropriate. Operational data utilized in the present embodiments is merely one example, one that is not required for identification of operation contents may be eliminated, and required one may also be added.

Although the k-nearest neighbor algorithm is exemplified as a specific example for work pattern recognition in the above-mentioned explanations, another method also can be utilized if such a method allows comparison of features of operation contents and frequency between current and past operation content frequency data similar to the k-nearest neighbor algorithm, and identification of a current work pattern. For example, clustering such as K-means clustering may be used to create a plurality of clusters from histograms of past operation content frequency data, ones that are labeled with particular work patterns similar to work patterns appearing in the respective clusters may be defined as a classifier, and a current work pattern may be identified based on the distances between the current operation content frequency data and the centers of the respective clusters (the average).

If, when the current and past operation content frequency data is compared by the work identifying section 35, there is one in the past operation content frequency data that matches a current one in terms of operation contents and frequency thereof, or there is one that is the most similar to it (if it is possible to narrow down to one similar one), a work pattern allocated to the past operation content frequency data may be treated as a current work pattern.

Note that the present invention is not limited to the above-mentioned embodiment, but include various modifications within the range not departing from the gist of it. For example, the present invention is not limited to ones including all the configurations that are explained in the above-mentioned embodiment, but includes ones from which some of the configurations are eliminated.

In addition, the respective configurations that are related to the above-mentioned controller 28, and functions, executed processes and the like of the respective configurations may be realized partially or entirely by hardware, for example, by designing logics to execute the respective functions using an integrated circuit, and so on. In addition, the configurations related to the above-mentioned controller 28 may be a program (software) with which the respective functions related to the configurations of the controller 28 are realized by being read out from and executed by an arithmetic processing unit (a CPU, for example). Information related to the program can be stored for example in a semiconductor memory (a flash memory, a SSD, etc.) a magnetic storage device (a hard disk drive, etc.), a recoding medium (a magnetic disk, an optical disk, etc.), or the like. Furthermore, processes of the respective sections related to the controller 28 may be distributed to a plurality of computers, and a system may be constructed by the plurality of computers and a work machine.

DESCRIPTION OF REFERENCE CHARACTERS

1: Hydraulic excavator (work machine)
3: Work implement
4: Upper swing structure
5: Lower track structure
6: Boom
7: Arm
8: Bucket
9: Boom cylinder
10: Arm cylinder
11: Bucket cylinder
13: Swing drive device (swing motor)
15: Travel motor
17: Operation device
28: Controller
29: Display device
30: Posture sensor
31: Operation amount sensor
32: Load sensor
33: Data acquiring section
34: Storage section
35: Work identifying section
38: Position calculating section
39: Travel pattern screen
40: Normal excavation pattern screen
41: Slope-tamping pattern screen
42: Embanking pattern screen
43: Loading pattern screen
49: Display control section

The invention claimed is:
1. A work machine including
an articulated-type work implement,
an operation device that outputs an operation signal corresponding to an operation amount, and
a plurality of actuators that are driven based on the operation signal output from the operation device and that drive the work implement, wherein
the work machine forms a target work surface using the work implement,
the work machine comprises:
a plurality of sensors that senses a plurality of parameters to serve as indicators of operation contents performed via the operation device;

a display device that displays a guide screen corresponding to a work pattern of the work machine; and
a controller that performs screen display control of the display device,
wherein the plurality of sensors include:
a posture sensor for the work implement,
load sensors for the plurality of actuators, and
an operation amount sensor for the operation device,
wherein the controller includes:
a data acquiring section that acquires operation content frequency data indicating operation contents performed on the work machine and frequency of the operation contents in a period starting a predetermined time before a current time and ending at the current time, based on actions of the plurality of actuators, loads of the plurality of actuators, and a distance between the work implement and the target work surface, the actions being calculated from an output value of the operation amount sensor in the period, the loads being calculated from output values of the load sensors in the period, the distance being calculated from an output value of the posture sensor for the work implement in the period and a position of the target work surface,
a storage section that stores a plurality of guide screens each corresponding to one of a plurality of work patterns registered in advance as work patterns of the work machine,
a work identifying section that identifies a work pattern at the current time from the plurality of work patterns based on the operation content frequency data acquired by the data acquiring section, and
a display control section that selects, from the plurality of guide screens, a guide screen corresponding to the work pattern identified by the work identifying section, and
wherein the display device displays the guide screen selected by the display control section.

2. The work machine according to claim 1, wherein
the storage section stores actual result data of the operation content frequency data together with a work pattern performed at a time of acquisition of each piece of the actual result data, and
the work identifying section searches the actual result data for data that matches or is similar to the operation content frequency data acquired by the data acquiring section in terms of operation contents and frequency thereof, and identifies the work pattern at the current time based on a work pattern allocated to actual result data related to a result of the search.

3. The work machine according to claim 2, wherein
the work machine is an excavator including a track structure and a swing structure attached swingably to an upper portion of the track structure, the work implement being attached to the swing structure in the excavator, and
the plurality of actuators drive the track structure, the swing structure, and the work implement.

4. The work machine according to claim 3, wherein
the plurality of guide screens stored in the storage section include at least two of a normal excavation pattern screen on which a side view of a tip portion of the work implement and the target work surface are displayed, a loading pattern screen on which a loading amount and total loading amount of loading by the work implement are displayed, a travel pattern screen on which a direction of a destination and a top view of the excavator are displayed, a slope-tamping pattern screen on which an area in which slope-tamping has been performed and the number of times the slope-tamping has been performed are displayed, and an embanking pattern screen on which a side view of a tip portion of the work implement, the target work surface, and a current embanking situation are displayed.

\* \* \* \* \*